(12) United States Patent
Box

(10) Patent No.: US 12,061,209 B2
(45) Date of Patent: Aug. 13, 2024

(54) METHOD AND SYSTEM OF UTILIZING OVERSIZED TIRES AND/OR WHEELS ON A VEHICLE CHASSIS

(71) Applicant: Skeeter Brush Trucks, LLC, Hillsboro, TX (US)

(72) Inventor: Wade Lewis Box, Burleson, TX (US)

(73) Assignee: SKEETER BRUSH TRUCKS, LLC, Hillsboro, TX (US)

( * ) Notice: Subject to any disclaimer, the term of this patent is extended or adjusted under 35 U.S.C. 154(b) by 143 days.

(21) Appl. No.: 18/074,698

(22) Filed: Dec. 5, 2022

(65) Prior Publication Data

US 2023/0243862 A1 Aug. 3, 2023

Related U.S. Application Data

(60) Provisional application No. 63/305,086, filed on Jan. 31, 2022.

(51) Int. Cl.
*G01P 3/44* (2006.01)
*B60B 7/06* (2006.01)
*B60C 19/00* (2006.01)

(52) U.S. Cl.
CPC ............... *G01P 3/44* (2013.01); *B60B 7/063* (2013.01); *B60C 19/00* (2013.01); *B60C 2019/004* (2013.01)

(58) Field of Classification Search
CPC .. G01P 3/44; G01P 1/026; G01P 3/487; G01P 3/488; B60B 7/063; B60B 3/16; B60B 3/147; B60B 27/0068; B60C 19/00; B60C 2019/004
See application file for complete search history.

(56) References Cited

U.S. PATENT DOCUMENTS

| | | | |
|---|---|---|---|
| 7,116,096 B2 | 10/2006 | Waszkowski et al. | |
| 7,306,293 B2 | 12/2007 | Redgrave | |
| 2005/0035758 A1* | 2/2005 | Waszkowski | G01P 13/04 324/207.25 |
| 2006/0124411 A1* | 6/2006 | Redgrave | B60T 8/329 188/218 XL |
| 2019/0120312 A1* | 4/2019 | White | B60T 8/329 |
| 2020/0122692 A1* | 4/2020 | Bollinger | B60B 27/0068 |
| 2021/0061027 A1* | 3/2021 | Da Deppo | B60C 23/041 |

* cited by examiner

*Primary Examiner* — Alvaro E Fortich
(74) *Attorney, Agent, or Firm* — Ewing & Jones, PLLC

(57) ABSTRACT

Embodiments presented provide for a system installable on a vehicle chassis that compensates for wheels and tires that vary from original manufacturer equipment to allow on-board safety systems to correctly ascertain and maintain proper vehicle dynamics.

21 Claims, 5 Drawing Sheets

METHOD AND SYSTEM OF UTILIZING OVERSIZED TIRES AND/OR WHEELS ON A VEHICLE CHASSIS

CROSS-REFERENCE TO RELATED APPLICATIONS

This application is a nonprovisional application which claims priority from U.S. provisional application No. 63/305,086, filed Jan. 31, 2022, which is incorporated by reference herein in its entirety.

FIELD OF THE DISCLOSURE

Aspects of the disclosure relate to vehicle speed sensing systems and anti-lock braking systems for vehicles. More specifically, aspects of the disclosure relate to a system and method for improved vehicle performance when larger size tires and/or wheels are equipped on a vehicle having a vehicle speed sensing system and anti-lock braking system.

BACKGROUND

Vehicle safety systems are created to allow a computer system to identify vehicle dynamics while an individual is driving and then adapt safety systems on-board the vehicle based upon data that is received from a number of sensors. One of the primary systems that is monitored on a continual basis is vehicle speed. Vehicle speed may be used in performing calculations that are necessary for other safety systems such as, for example, anti-lock braking systems as well as anti-rollover protection safety systems. To this end, vehicle speed systems are often a critically measured performance metric upon which other decisions are made for an occupant.

While vehicle speed is a relatively easy measure to determine, vehicle speed calculations may be altered unknowingly by individuals who retrofit the standard components in their vehicle over time. One such retrofit of systems that impact vehicle speed includes using different size tires and/or wheels on the vehicle. In one instance, for example, if a larger wheel and tire combination is used compared to a standard factory equipped vehicle, a single revolution of the wheel will cover more distance than originally prescribed. Therefore, while an indicated speed of the vehicle may be 60 mph, an actual vehicle speed could be many more miles per hour greater than the indicated speed because the vehicle is traveling a greater distance with each wheel revolution compared to a standardized system as produced from the factory.

Greater vehicle speeds may impact anti-lock braking systems that use vehicle speed as a performance metric for determining if brakes should be applied and how strongly the brakes should be applied based upon prevailing road conditions. Thus, the anti-lock braking system may calculate that a vehicle may safely decelerate to a stop within a prescribed amount of time, however, due to the actual vehicle speed being greater than the measured vehicle speed, an accident may occur because the vehicle cannot decelerate in a sufficient amount of time given the road parameters.

Given that vehicle speed is so important for vehicle safety systems, as well as allowing the vehicle operator to travel at a safe and known velocity along the highway, there is a need to allow for changes to the size of wheels and tires of a vehicle to compensate for variations that may occur with the use of aftermarket components and parts on the vehicle.

There is a further need to provide a system that will allow, over time, the ability to modify a vehicle speed sensing system such that indicated speeds for a vehicle traveling along the road are correct within a specific performance regime.

There is a further need to provide a system that is economical to install on a vehicle chassis and that will not interfere with vehicle performance.

There is a further need to provide for effective reuse of standard factory equipment such that wiring and or computer calculations remain as consistent as possible with standard vehicle equipment as produced by the factory.

There is a further need to provide for an easily understandable and retrofittable system for multiple types of vehicles from different manufacturers.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment of the disclosure a system is illustrated. The system comprises a wheel extender configured to be attached to a rim of a vehicle, and a tone ring configured to be inserted on to a set of studs, the tone ring configured with a number of holes to match the set of studs. The system also comprises a set of wheel extender nuts, wherein one nut is provided for each stud and a brake clip configured to be attached to a brake caliper, the brake clip having a slot. The system also comprises a sensor extension bracket configured to be attached to the brake clip at the slot, the sensor extension bracket configured to attach and hold a wheel speed sensor.

In one example embodiment, a system is disclosed. The system may comprise, a wheel extender configured to be attached to a rear brake of a vehicle and a tone ring configured to be inserted on to a set of studs, the tone ring configured with a number of holes to match the set of studs. The system may also comprise a set of push on retainers, wherein each push on retainer is provided for each stud and a brake clip configured to be attached to a brake caliper, the brake clip having a slot. The system may also comprise a sensor extension bracket configured to be attached to the brake clip at the slot at a connection, the sensor extension bracket configured to attach and hold a wheel speed sensor.

In one example embodiment, a method for adapting a vehicle speed sensing system to produce correct speed results after exchanging at least one of a wheel size and a tire to a size other than a standard factory equipment size is disclosed. The method may comprise calculating a pulse frequency that one of an anti-lock brake system, speedometer and a traction control system expects for the standard factory equipment size to produce an original equipment manufacturer number. The method may also comprise calculating a pulse frequency that one of an anti-lock brake system, speedometer and a traction control system occurs for the at least one of the wheel size and tire size to be placed on the vehicle to produce a revised number axial number.

The method may also comprise calculating a ratio between the original equipment manufacturer number and the revised axial number to produce a final ratio. The method may also comprise placing a wheel speed sensor at a new position point near a tone ring of the vehicle speed sensing system correlating to the final ratio.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not to be considered limiting of its scope, for the disclosure may admit to other equally effective embodiments.

Figure 1:
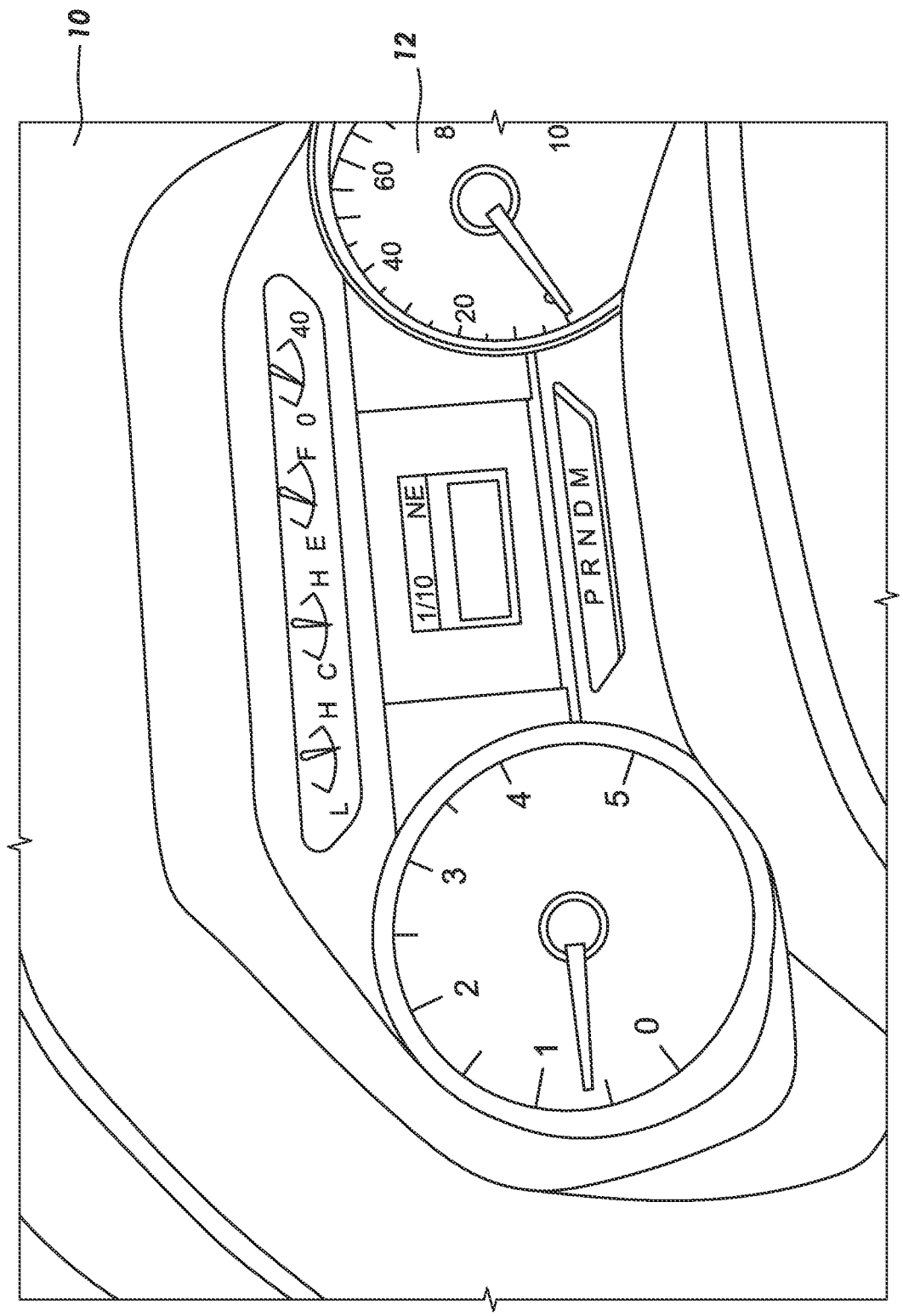
FIG. 1 is a an illustration of a conventional dashboard including a speedometer.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure.

Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Embodiments of one aspect of the disclosure provide for a method and system for utilizing oversized tires and or rims on a vehicle chassis. In one particular embodiment of the disclosure, an assemblage of four rings is used each with an alternating plurality of magnetic and nonmagnetic material. The individual rings are attached to wheel ends. In one example embodiment, one of the individual rings is placed on each front wheel and an adjustable bracket position is provided for the original equipment manufacturer wheel speed sensors to keep the two in close proximity. In doing so, the magnetic and nonmagnetic materials interact with the magnetic field of the wheel speed sensors to create an electrical pulse. Aspects of this disclosure allow for the vehicle to use larger tires and wheels than arranged, specified or even contemplated by the original equipment manufacturer. In addition, the indicated reading of the speedometer is automatically corrected and does not incite warnings or errors with traction control systems or anti-lock braking systems.

As will be vehicles braking system and traction control system generally have a built in tolerance to accommodate different variables experienced during driving. An original equipment manufacturer has also incorporated a tolerance allowing tire size changes within a narrow range to accommodate various industries. It is desirable, however, at some instances to use larger tires and wheels within an environment, such as an off-road environment. This is commonly done on vehicles that have a special purpose for traversing such terrain. Terrain can vary from dry to wet to muddy to streams to sand and other obstacles. The anti-lock braking system and the traction control system do not accommodate for tire and wheel sizes that are larger than a pre-described amount, therefore, if the user desires more off-road capability, they are potentially sacrificing safety aspects of the vehicle based upon incorrect readings of velocity during their travels. In some rare occurrences, automatic or advanced driver assistance traction control systems may have to be deactivated as a multitude of errors may occur for the driver.

FIG. 1 depicts conventional dashboard 10 of a vehicle (truck) that is equipped with a vehicle speed sensing system. As is illustrated, speedometer 12 is positioned at the right side of the dashboard. In some embodiments, speedometer 12 may be actuated by magnetic impulses picked up by rotation of a surface in close relationship.

Figure 2:
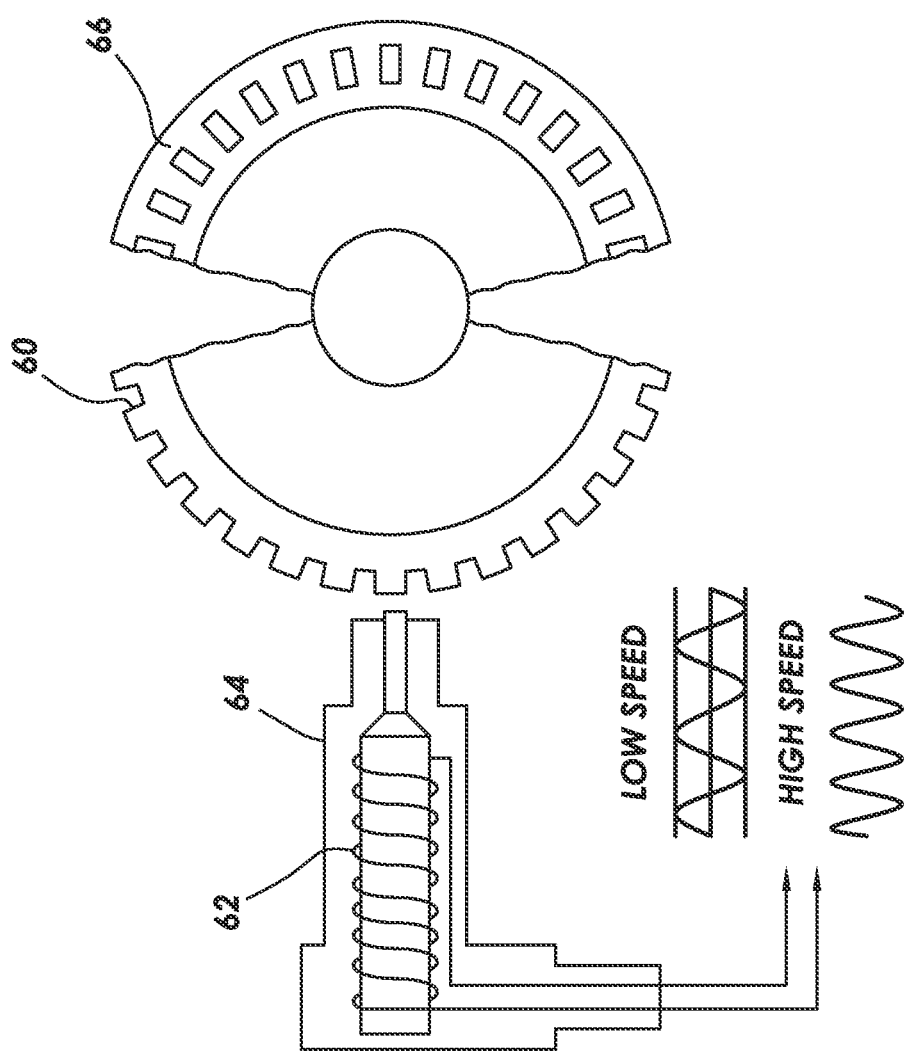
FIG. 2 is an illustration of exciter rings, showing both toothed and slotted versions and pulse frequency.

FIG. 2, depicts in one embodiment, toothed exciter ring 60, which rotates in close proximity to a pick-up coil 62. As metal of toothed exciter ring 60 or rib/slot excitor ring 66 passes in and out of the magnetic field produced in proximity of wheel speed sensor 64, an electrical pulse is generated. Wheel speed sensor may be, for example, an inductive, magneto-restrictive, or Hall Effect type sensor. The frequency of the pulse may be used to determine the overall speed of rotation of the toothed exciter ring 60 located next to wheel speed sensor 64. In other embodiments, instead of a toothed exciter ring 60, a rib/slot exciter ring 66 may be used. As can be understood, the faster the frequency of the signal produced by the rotating rings 60,66, the greater speed of the vehicle.

Figure 3:
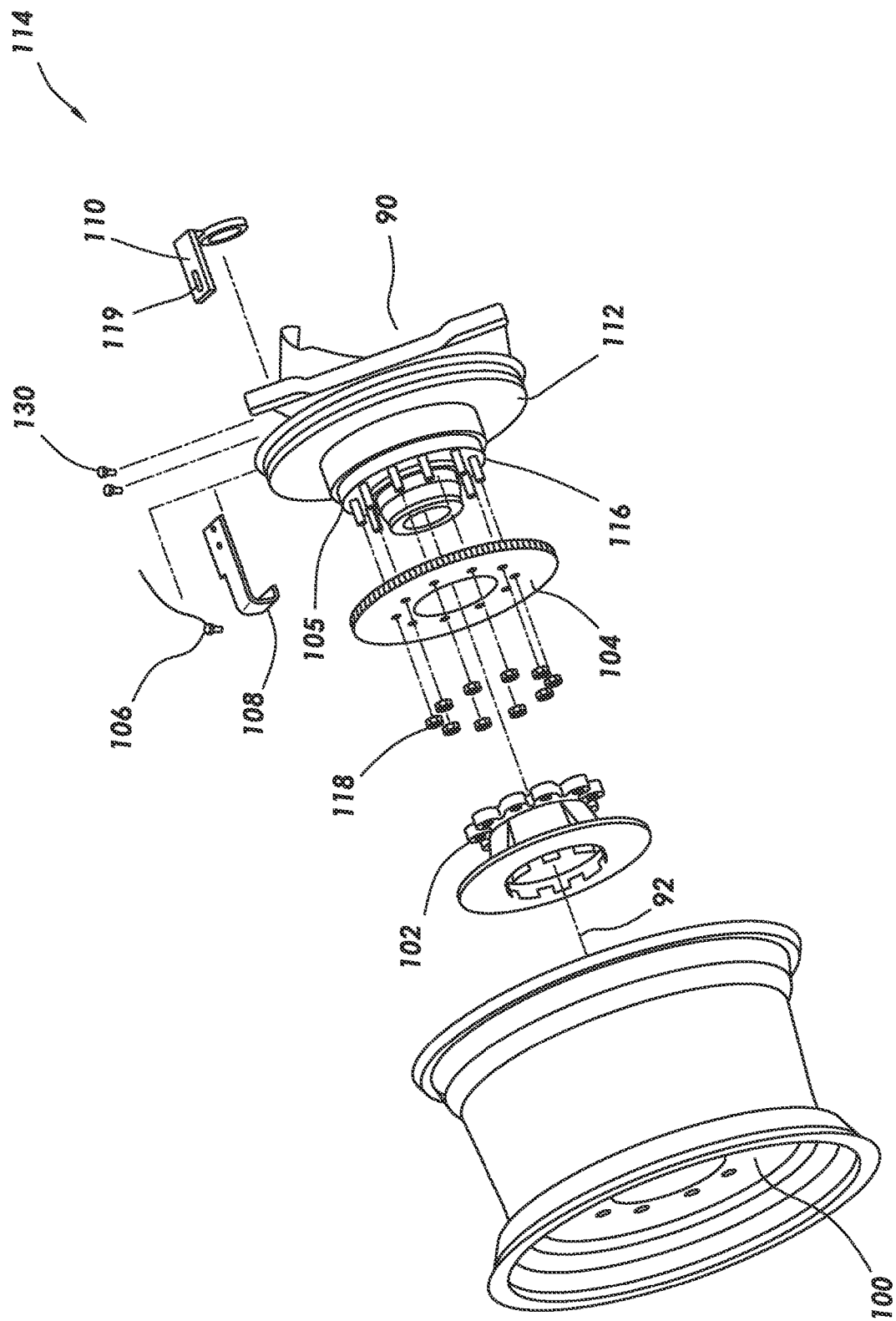
FIG. 3 is an front wheel expanded view of a system in accordance with one example embodiment of the disclosure.

Referring to FIG. 3, an exploded view of an example embodiment of the disclosure for use with the front wheels of the vehicle is illustrated. FIG. 3 depicts front wheel system 90. Front wheel system 90 includes rim 100 that can be attached to a wheel extender 102. The rim 100 is configured to rotate around axis 92 along with other components described below. A tone ring 104 is positioned such that magnetic materials within the tone ring 104 are sensed by wheel speed sensor 64. The wheel speed sensor 64 is held in place by a sensor extension bracket 108. The sensor extension bracket 108 attaches to a brake clip 110 that attaches to a front spindle 112 using screw 106. Connection between the sensor extension bracket 108 and the brake clip 110 may be made through a slotted connection 119 on the brake clip 110 and two holes on the sensor extension bracket 108 with cap screws 130.

The tone ring 104 is attached to the hub 105 of the brake 114 through studs 116 and wheel extender nuts 118. The wheel extender nuts, in one example embodiment, may be torqued to 130 pound feet for attachment of the tone ring 104. The wheel speed sensor 64 is finely tuned to read magnetic fluctuations that occur through rotation of the tone ring 104. The slotted connection 119 of the brake clip 110 allows for placement of the wheel speed sensor 64 closer or further away from the surface of the tone ring 104.

In further embodiments, a shroud may be placed in connection with the wheel speed sensor 64 to prevent contamination from penetrating between the wheel speed sensor 64 and the tone ring 104. The shroud may also contain wire holding portions to prevent associated wires from the wheel speed sensor 64 from pinching or turning sharp corners to prevent premature fraying of wires for the wheel speed sensor 64.

Figure 4:
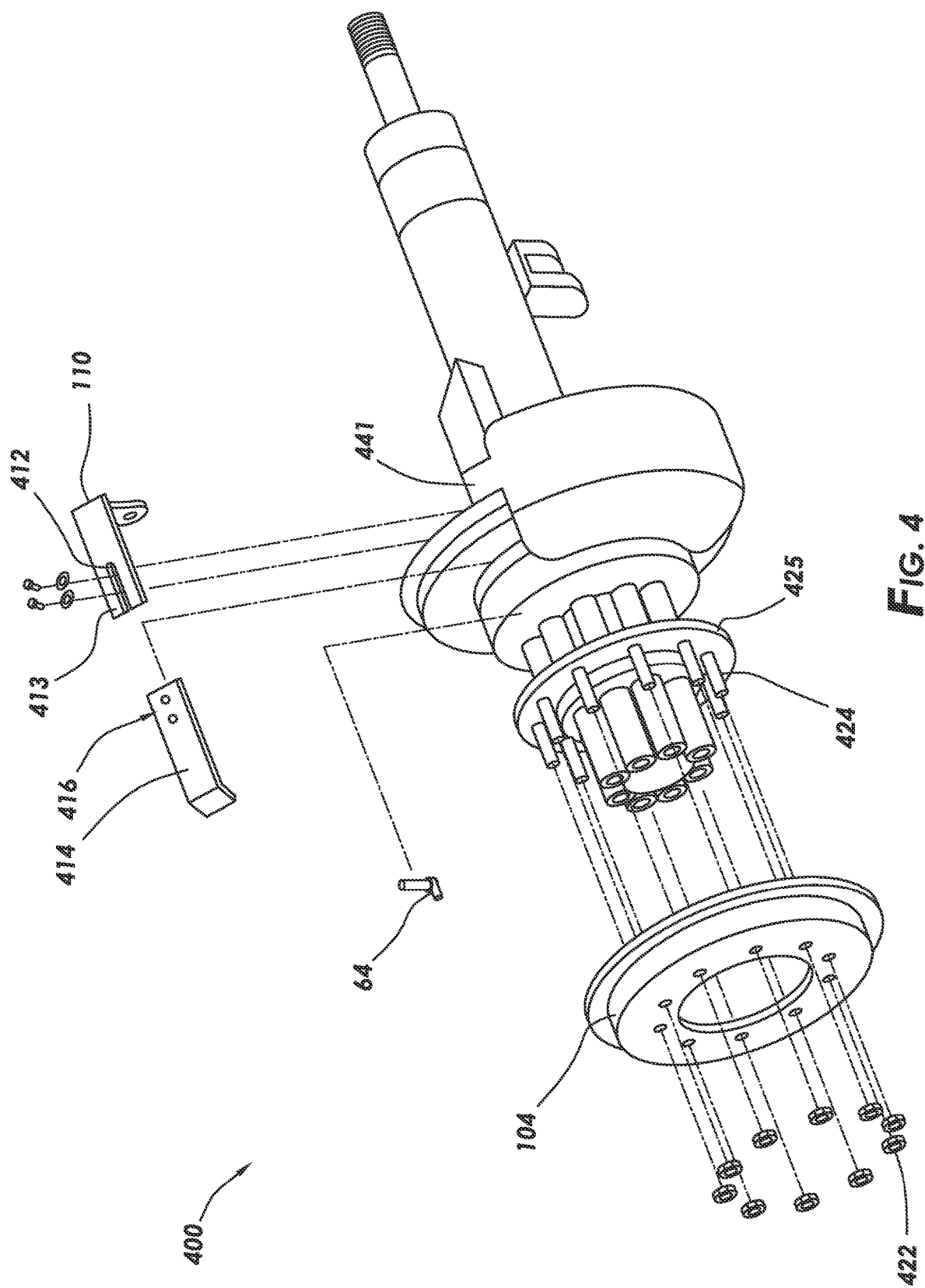
FIG. 4 is a rear wheel expanded view of a system in accordance with one example embodiment of the disclosure.

Referring to FIG. 4, an example embodiment is illustrated for placement on the rear wheels of a vehicle. As will be understood, the geometry of a set of rear wheels may be different than front wheels, as illustrated in FIG. 3. Many vehicles have wheel speed sensors 64 placed in both forward and rear wheel sets; therefore both systems illustrated in FIG. 3 and FIG. 4 may be utilized at one time. Similar to the embodiment of FIG. 3, the rear wheel system 400 may use a tone ring 104 coupled with a wheel speed sensor 64 that is configured to identify the rotation of the tone ring 104. Tone ring 104 is centered on brake disc hub 425. A brake clip 110 is provided to connect to the brake caliper though a connection 412. The connection 412 may be, for example, two bolts. The bolts may be torqued, for example, to 166 pound feet. The brake clip 110 may be provided with a slot 413 that allows a sensor extension bracket 414 to be attached through the use of a second connection 416. Brake clip 110 may be mounted to caliper 441. The second connection 416 may be established through the use of cap screws with flat washers. The sensor extension bracket 414 may support the wheel speed sensor 64. Push on retainers 422 may be used to connect the tone ring 104 to the wheel extender 424, as illustrated.

In one example embodiment, calculations are performed illustrating the specific parameters of one system.

The original equipment manufacturer system uses sixty (60) teeth on the front wheels, and sixty eight (68) teeth on the rear wheels to supply wheel speed information to the anti-lock braking system, speedometer and traction control system based on the tire size provided by the original equipment manufacturer. One non-limiting example of an original equipment manufacturer tire is a Continental 225/70 R19.5. This example is used below in example calculations.

Embodiments of the present disclosure may use a different size tire than the one specified by the original equipment manufacturer. In order to use a new tire with a different overall configuration, (e.g. the Continental MPT 81, 335/80 R20 tire), a pulse frequency is calculated that the anti-lock braking system, speedometer and traction control system expects.

On the front of the chassis, using a 60 tooth tone ring, the 225/70 R19.5 tire turns 633 times over one mile.

$$\left[\frac{633 \text{ Revolutions}}{\text{mile}}\right] * \left[\frac{60 \text{ Pulses}}{\text{Revolution}}\right] = \frac{37,980 \text{ Pulses}}{\text{mile}}$$

Whereas the 335/80 R20 tire turns 491 times over one mile.

$$\left[\frac{491 \text{ Revolutions}}{\text{mile}}\right] * \left[\frac{60 \text{ Pulses}}{\text{Revolution}}\right] = \frac{29,460 \text{ Pulses}}{\text{mile}}$$

Taking a ratio of these two values per mile, and multiplying it times the number of tone ring teeth in the front and rear, the expected pulse frequency is calculated as seen below:

$$\left[\frac{37,980 \text{ Pulses}}{\text{mile}}\right] * \left[\frac{\text{mile}}{29,460 \text{ Pulses}}\right] (60 \text{ Tone Ring teeth}) =$$

$$77.352 \cong 77 \text{ front magnetic/non-magnetic sectors}$$

$$\left[\frac{37,980 \text{ Pulses}}{\text{mile}}\right] * \left[\frac{\text{mile}}{29,460 \text{ Pulses}}\right] (68 \text{ Tone Ring teeth}) =$$

$$87.666 \cong 88 \text{ rear magnetic/non-magnetic sectors}$$

Wheel Speed Sensors

The wheel speed sensors, such as when the wheel speed sensors are inductive sensors, may include a magnet wrapped with conductive wire. Using the principles of electromagnetic induction, the passing of the magnetic and non-magnetic segmented rings in close proximity to the sensor creates an electrical current in addition to the electrical current provided by the system. The variations of electrical current are processed by their respective electronics.

Figure 5:
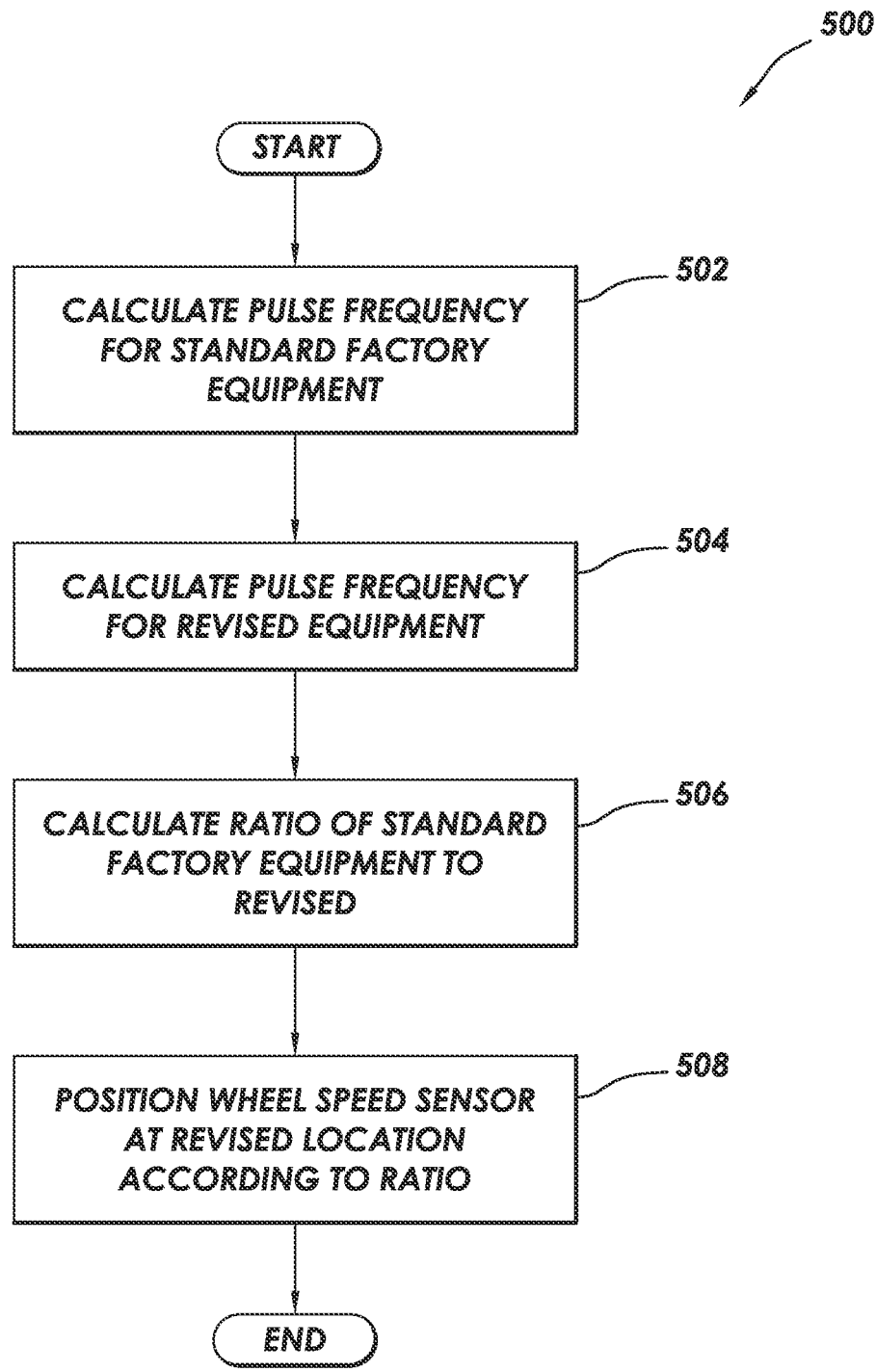
FIG. 5 is a method of utilizing at least one of the oversized tires and rims on a vehicle chassis in one example embodiment of the disclosure.

Referring to FIG. 5, a method 500 for adapting a vehicle speed sensing system to produce correct speed results after exchanging at least one of a wheel size and a tire to a size other than standard factory equipment sizes. The method 500 comprises, at 502 calculating a pulse frequency that one of an anti-lock brake system, speedometer and a traction control system expects for the standard factory equipment size. At 504, the method includes calculating a pulse frequency that one of an anti-lock brake system, speedometer and a traction control system occurs for the at least one of the wheel size and tire size to be placed on the vehicle. At 506, the method further comprises taking a ratio between the value obtained at 502 and the value obtained at 504. At 508 the method continues with placing a wheel speed sensor at a position near a tone ring of the vehicle speed sensing system correlating to the ratio obtained at 506.

Embodiments of the disclosure provide for the ability to change the size of wheels and tires of a vehicle to compensate for variations that may occur with the use of aftermarket components and parts on the vehicle.

Embodiments of the disclosure provide for the ability to modify a vehicle speed sensing system such that indicated speeds for a vehicle traveling along the road are correct within a specific performance regime.

Embodiments of the disclosure provide for the ability to provide a system that is economical to install on a vehicle chassis and that will not interfere with vehicle performance.

Embodiments of the disclosure provide a system for effective reuse of standard factory equipment such that wiring and or computer calculations remain as consistent as possible with standard vehicle equipment as produced by the factory.

Embodiments of the disclosure provide a system that is easily understandable and retrofittable system for multiple types of vehicles from different manufacturers.

In one example embodiment of the disclosure a system is illustrated. The system comprises a wheel extender configured to be attached to a rim of a vehicle, and a tone ring configured to be inserted on to a set of studs, the tone ring configured with a number of holes to match the set of studs. The system also comprises a set of wheel extender nuts, wherein one nut is provided for each stud and a brake clip configured to be attached to a brake caliper, the brake clip having a slot. The system also comprises a sensor extension bracket configured to be attached to the brake clip at the slot, the sensor extension bracket configured to attach and hold a wheel speed sensor.

In one example embodiment, a system is disclosed. The system may comprise, a wheel extender configured to be attached to a rear brake of a vehicle and a tone ring configured to be inserted on to a set of studs, the tone ring configured with a number of holes to match the set of studs. The system may also comprise a set of push on retainers, wherein each push on retainer is provided for each stud and a brake clip configured to be attached to a brake caliper, the brake clip having a slot. The system may also comprise a sensor extension bracket configured to be attached to the brake clip at the slot at a connection, the sensor extension bracket configured to attach and hold a wheel speed sensor.

In another example embodiment of the disclosure the connection is at least one cap screw.

In another example embodiment of the disclosure the brake clip is attached to the brake caliper through at least two brake caliper bolts.

In another example embodiment of the disclosure the system may be configured wherein the brake caliper bolts are upper brake caliper bolts.

In another example embodiment of the disclosure the system may be configured wherein the set of push on retainers is ten units.

In another example embodiment of the disclosure the system may be configured wherein the connection allows the wheel speed sensor to be moved along a lateral direction.

In one example embodiment, a method for adapting a vehicle speed sensing system to produce correct speed results after exchanging at least one of a wheel size and a tire to a size other than a standard factory equipment size is disclosed. The method may comprise calculating a pulse frequency that one of an anti-lock brake system, speedometer and a traction control system expects for the standard factory equipment size to produce an original equipment manufacturer number. The method may also comprise calculating a pulse frequency that one of an anti-lock brake system, speedometer and a traction control system occurs for the at least one of the wheel size and tire size to be placed on the vehicle to produce a revised axial number. The method may also comprise calculating a ratio between the original equipment manufacturer number and the revised axial number to produce a final ratio. The method may also comprise placing a wheel speed sensor at a new position point near a tone ring of the vehicle speed sensing system correlating to the final ratio.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A system, comprising:
    a wheel extender configured to be attached to a rim of a vehicle;
    a tone ring configured to be clamped between the wheel extender and a hub of a brake of a vehicle and to be inserted onto a set of studs, the tone ring configured with a number of holes to match the set of studs, the studs extending from the front spindle;
    a set of wheel extender nuts, wherein one nut is provided for each stud and attached for each stud;
    a brake clip configured to be attached to a brake caliper, the brake caliper connected to the brake, the brake clip having a slot; and
    a sensor extension bracket configured to be attached to the brake clip at the slot, the sensor extension bracket configured to attach and hold a wheel speed sensor.

2. The system of claim 1, wherein the wheel speed sensor is an inductive, magneto-restrictive, or Hall Effect type sensor.

3. The system according to claim 1, further comprising:
    at least two bolts, wherein a sensor is attached to the bracket by holes in the sensor extension bracket and the brake clip.

4. The system according to claim 1, wherein the tone ring is a toothed exciter ring.

5. The system according to claim 1, wherein the tone ring is a rib/slot exciter ring.

6. The system according to claim 1, wherein the tone ring includes an alternating plurality of magnetic and non-magnetic material.

7. The system according to claim 1, wherein the sensor includes a pick-up coil.

8. A system, comprising:
   a tone ring configured to be inserted on to a set of studs, the tone ring configured with a number of holes to match the set of studs, the studs extending from the wheel extender, the tone ring centered on the brake disc hub;
   a set of push on retainers, wherein each push on retainer is provided for each stud and wherein each set of push on retainers is affixed to the tone ring;
   a brake clip configured to be attached to a brake caliper, the brake clip having a slot; and
   a sensor extension bracket configured to be attached to the brake clip at the slot at a connection, the sensor extension bracket configured to attach and hold wheel speed sensor.

9. The system of claim 1, wherein the wheel speed sensor is an inductive, magneto-restrictive, or Hall Effect type sensor.

10. The system according to claim 8, wherein the connection is at least one cap screw.

11. The system according to claim 8, wherein the brake clip is attached to the brake caliper through at least two brake caliper bolts.

12. The system according to claim 8, wherein the brake caliper bolts are upper brake caliper bolts.

13. The system according to claim 8, wherein the set of push on retainers is ten units.

14. The system according to claim 8, wherein the connection allows the wheel speed sensor to be moved in a lateral direction.

15. The system according to claim 8, wherein the tone ring is a toothed exciter ring.

16. The system according to claim 8, wherein the tone ring is a rib/slot exciter ring.

17. The system according to claim 8, wherein the tone ring includes an alternating plurality of magnetic and non-magnetic material.

18. The system according to claim 8, wherein the sensor includes a pick-up coil.

19. A method for adapting a vehicle speed sensing system to produce correct speed results after exchanging at least one of a wheel size and a tire size to a size other than a standard factory equipment size, comprising:
   calculating a first pulse frequency based on the standard factory equipment size to produce an original equipment manufacturer number;
   calculating a second pulse frequency that one of an anti-lock brake system, speedometer and a traction control system occurs for the at least one of the wheel size and tire size to be placed on the vehicle to produce a revised number axial number;
   calculating a ratio of the first pulse frequency to the second pulse frequency to produce a final pulse frequency ratio; and
   placing wheel speed sensor at a new position point near a tone ring of the vehicle speed sensing system correlating to the final pulse frequency ratio.

20. The method of claim 19, wherein the first pulse frequency is calculated by determining the number of revolutions per mile made by a first tire associated with the standard factory equipment size multiplied by the pulses per revolution from the sensor.

21. The method of claim 19, wherein the second pulse frequency is calculated by:
   determining the number of revolutions per mile made by a second tire associated with the wheel size and tire size to be placed on the vehicle multiplied by the pulses per revolution from the sensor.

* * * * *